United States Patent [19]

Brooks, Jr. et al.

[11] Patent Number: 5,074,029
[45] Date of Patent: Dec. 24, 1991

[54] METHOD FOR STRINGING WIRE ON AN ACTUATOR ARM

[75] Inventors: William W. Brooks, Jr.; Jeff B. Brown, both of Rochester; Jerome T. Coffey, Oronoco; Richard H. Estry, Rochester; Marlin P. Graves, Rochester; Gary L. Heitkamp, Rochester; Larry H. Lengerman, Rochester; Thomas J. Myhre, Sr., Stewartwille; Terrance L. Schaefer, Rochester; Paul D. Teig, Byron; Arvid C. Tougas, Plainview; Donald J. Wanek, Rochester; John H. Wirz, Pine Island; Walter E. Zahn, Oronoco, all of Minn.

[73] Assignee: International Business Machines Corporation, Armonk, N.Y.

[21] Appl. No.: 591,911

[22] Filed: Oct. 2, 1990

[51] Int. Cl.⁵ .............................................. G11B 5/42
[52] U.S. Cl. ..................................... 29/603; 29/747; 29/854; 29/860
[58] Field of Search ................ 29/603, 747, 854–856, 29/860

[56] References Cited

U.S. PATENT DOCUMENTS

4,759,119 7/1988 Noguchi et al. ................ 29/603

Primary Examiner—Carl E. Hall
Attorney, Agent, or Firm—Richard E. Billion

[57] ABSTRACT

A method and apparatus in which the wires from the heads on an actuator arm can be positioned and attached to the arm electronics automatically. A loadspring manufacturing assembly has a pair of wire carrying and positioning tails and a disposable portion. The disposable portion and the wire carrying and positioning tails each have pegs for controlling the position of the wire and for allowing twisting of the wire pairs for purposes of noise suppression. The wires are positioned about the pegs and twisted. The wires are then bonded to the loadspring assembly. A portion of the wire carrying tail has a window or opening therein. The wires are fanned out and spaced apart as they pass across the window. The wire carrying portion also has a living hinge. A portion of the wire carrying tail which includes a latching window which latches a peg is moved about the hinge and positioned at about a right angle to the loadspring. The disposable portion and the unused tail are removed. The remaining assembly is attached to the arm electronics module through the window with the spaced apart wires.

5 Claims, 8 Drawing Sheets

METHOD FOR STRINGING WIRE ON AN ACTUATOR ARM

FIELD OF THE INVENTION

The present invention pertains to the field of disk drives which are also called direct access storage devices (DASD).

More particularly, this invention pertains to the method and apparatus for manufacturing the actuator arm.

BACKGROUND OF THE INVENTION

One of the key components of a computer system is a place to store data. Typically computer systems employ a number of storage means to store data for use by a typical computer system. One of the places where a computer can store data is in a disk drive which is also called a direct access storage device.

A disk drive or direct access storage device includes several disks which look similar to records used on a record player or compact disks which are used in a CD player. The disks are stacked on a spindle, much like several 45 rpm records awaiting to be played. In a disk drive, however, the disks are mounted to the spindle and spaced apart so that the separate disks do not touch each other.

The surface of each disk is uniform in appearance. However, in actuality, each of the surfaces is divided into portions where data is stored. There are a number of tracks situated in concentric circles like rings on a tree. Compact disks have tracks as do the disks in a disk drive. The tracks in either the disk drive or the compact disk essentially replace the grooves on a conventional record. Each track in a disk drive is further subdivided into a number of sectors which is essentially just one section of the circumferential track.

Disks in a disk drive are made of a variety of materials. Most commonly, the disk is made of metal or plastic. The material from which the disk is made determines how data is stored on the disk. A plastic disk, such as those used as CD's, stores data using lasers and a laser is used to read the data back. Storage of data on a metal disk entails magnetizing portions of the disk in a pattern which reflects the data.

To store data on a metal disk, the metal disk is magnetized. In order to magnetize the surface of a disk, a small ceramic block which contains a magnetic transducer known as a write head is passed over the surface of the disk. More specifically, the write head is flown at a height of approximately six millionths of an inch from the surface of the disk and is flown over the track as the write head is energized to various states causing the track below to be magnetized to represent the data to be stored.

To retrieve data stored on a magnetic disk, the ceramic block contains a read head which is flown over the metal disk. The magnetized portions of the disk induce a current in the read head. By looking at output from the read head, the data can be reconstructed for use by the computer system.

Like a record, both sides of a disk are generally used to store data or other information necessary for the operation of the disk drive. Since the disks are held in a stack and are spaced apart from one another, both the top and the bottom surface of each disk in the stack of disks has a ceramic block, also known as a slider, associated with each surface. This would be comparable to having a stereo that could play both sides of a record at once. Each side would have a stylus which played the particular side of the record.

Disk drives also have something that compares to the tone arm of a stereo record player. There are two types of actuators, rotary and linear. Rotary disk drives have a tone arm that rotates much like a record player. The tone arm of a rotary disk drive, termed an actuator arm, typically has one ceramic block attached at one end. The other end of an actuator arm is attached to a comb like structure. As mentioned previously, each ceramic block includes a write head and a read head. There is one actuator arm associated with each surface of each disk. The comb-like structure facilitates holding the actuator arms.

Like a tone arm, the actuator arms rotate so that the read and write heads in the slider which is attached to the actuator arm can be moved to locations over various tracks on the disk. In this way, the write heads can be used to magnetize the surface of the disk in a pattern representing the data at one of several track locations or the read heads can be used to detect the magnetized pattern on one of the tracks of a disk. For example, the needed data may be stored on two different tracks on one particular disk, so to read the magnetic representations of data, the actuator arm is rotated from one track to another track. A linear actuator has a similar actuator arm, however, instead of repositioning by rotation, repositioning is accomplished through linear movement.

Both the read head and the write head require a pair of wires to be attached to the head itself. These wires are very fine and are about 0.0014 inches thick, which is about half the thickness of a human hair. The wires carry electrical signals. The electrical signals attached to the write head
are used to store representations of data on one of the disk surfaces of the disk drive. The electrical signals attached to the read head are used to carry signals representing the data back from one of the surfaces of the disk which has data stored on it. A set of wires for each read and write head are strung along each of the actuator arms in the disk drives. All of the sets of wires for all of the read heads and write heads are typically then attached to a flexible cable which allows the actuator arm to move while maintaining electrical connection with each of the heads.

In the past, attaching the fine wires to the read heads and the write heads, stringing the wire along the actuator arm and attaching the wire to the flexible cable has been a very labor intensive process. The fine wires were attached to the head and strung along the actuator arm by human beings. Much of the work was done under a microscope. Especially attaching one pair of fine wires to the read head and one pair of fine wires to the write head. The pairs of wires were also strung along the actuator arm by humans. Finally, the fine wires are attached to the flexible cable by people.

The past procedure has many shortcomings. Many of the shortcomings stem from the labor intensive nature of attaching the wires to the heads and flexible cable and stringing the wire along the actuator arm. Basically, the wires are very fine and small and the places to which the wires attach are also very small. Most of the attachment is done by soldering the ends of the wires to a small pad. This is very exacting and detailed work and by its nature is very prone to human error.

For example, the flexible cable includes pads which are spots on the flexible cable to which the ends of the wires from the various heads are attached. Since there are so many wires that must be attached to the flexible cable, the pads are very small and closely spaced. There are many possibilities for error in attaching the wires to the pads on the flexible cable. Prior to attaching the wires to the pads on the flexible cable, the wires must be sorted. On a disk drive having eight disks there are sixteen surfaces most of which have both a read and a write head associated therewith. Each surface has both a read and a write element and four wires. There are 62 very fine wires that must be sorted and attached to very small pads. The sorting process is tedious and very prone to mistakes.

Even after successfully sorting the various wires, the wires are soldered to pads that are very closely spaced. Attaching the wires is also a source of mistakes. It is difficult for a human to consistently apply just the right amount of solder to a pad without having it flow to a closely spaced adjacent pad. When it does flow to an adjacent pad, a short occurs so the electrical signal will not pass through the wires to the write head or from the read head.

The same types of problems occur when attaching the wires to the various read heads and write heads. Problems also occur since the work is not done uniformly and with consistency. One person, for example, may have a knack for accomplishing the tasks while another may take a long time to learn the skill. As a result, there are various levels of quality from person to person.

Other problems occur since the wires are so fine. For example, the wires can be crimped as it is sorted out which may result in a break in the electrical conductor which carries signals to or from the write or read elements on the slider.

As can be seen, there are many shortcomings associated with a human doing the task of attaching the wires to the head, stringing the wires along the suspension, twisting the wires for the purpose of noise suppression, sorting the wires and attaching them to the flexible cable where the wires terminate. This process seems prone to error, especially considering that the wires and pads upon which they are attached are very small. Because of the difficulty of this process as performed by humans, the time needed is high and as a result the labor costs are also high. The cost of the actuators are also increased in that more of the parts that are defective when compared to an automated process. Consequently, there is a need for an automated process by which the entire process of stringing the wires along the actuator arm and attaching the wires to the flexible cable can be automated.

SUMMARY OF THE INVENTION

Disclosed is a method and apparatus in which the wires from the head end of the actuator arm can be assembled automatically. A loadspring manufacturing assembly has a pair of wire carrying and positioning tails and a disposable portion. The disposable portion and the wire carrying and positioning tails each have pegs for controlling the position of the wire and for allowing twisting of the wire pairs for purposes of noise suppression.

The wires are positioned about the pegs and twisted. The wires are then bonded to the loadspring assembly. A portion of the wire carrying tail has a window or opening therein. Across the window the wires are fanned out and spaced apart. The wires are bonded to the loadspring and also near the window. The wire carrying portion also has a living hinge. A portion of the wire carrying tail which includes the window is moved about the hinge and positioned at about a right angle to the loadspring. The disposable portion and the unused tail are removed. The remaining assembly is attached to an actuator comb with other similar assemblies. The windows with the spaced apart wires are positioned for attachment to a flex cable when assembled.

These drawings are not intended as a definition of the invention but are provided solely for the purpose of illustrating the preferred embodiment of the invention described below.

DETAILED DESCRIPTION OF THE PREFERRED EMBODIMENT

Figure 1:
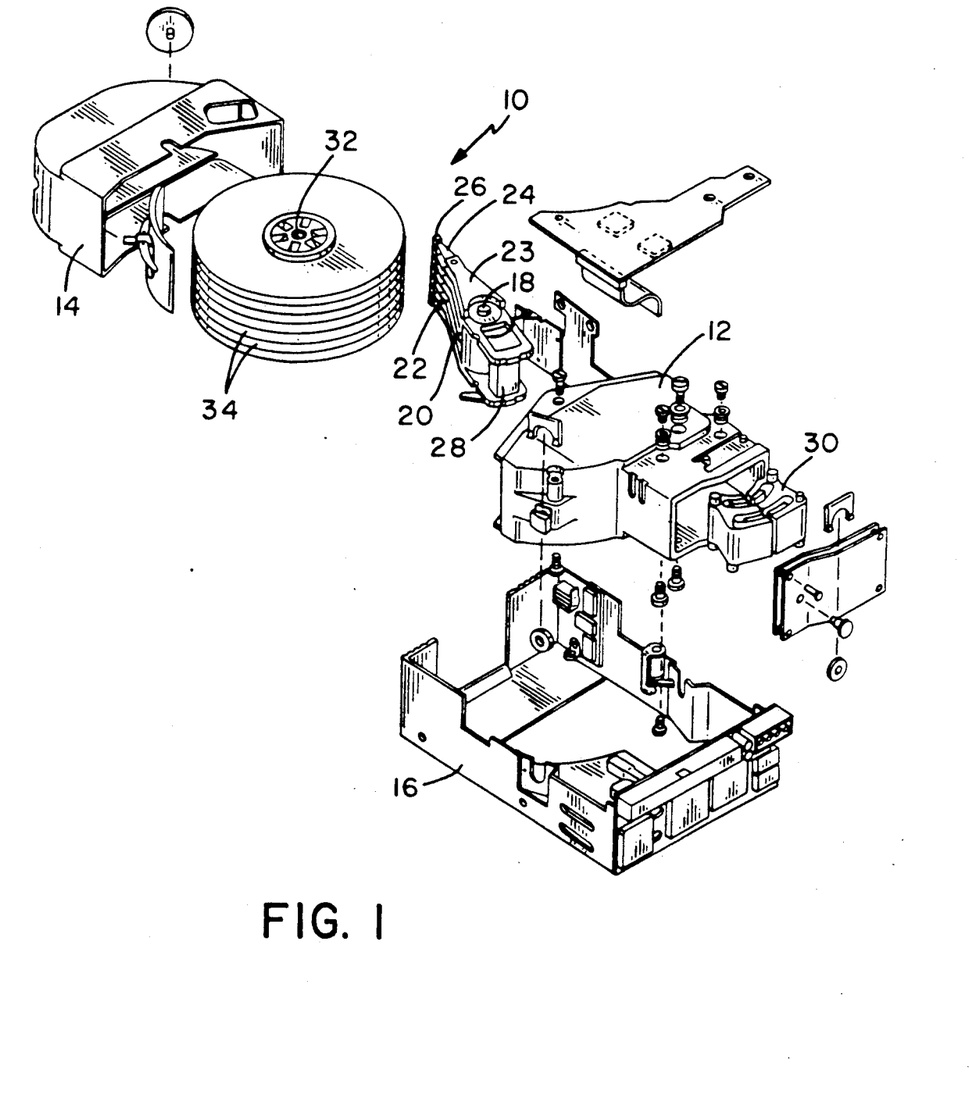
FIG. 1 is a exploded view of a disk drive.

The invention described in this application is useful with all mechanical configurations of disk drives or direct access storage devices ("DASD"). FIG. 1 is an exploded view of a disk drive 10. It should be noted that although a rotary actuator is shown the invention described herein is applicable to linear actuators. The disk drive 10 includes a housing 12, and a housing cover 14 which, after assembly, is mounted within a frame 16. Rotatably attached within the housing 12 on an actuator shaft 18 is an actuator arm assembly 20. One end of the actuator arm assembly 20 includes an E block or comb like structure 22 having a plurality of arms 23. Attached to the separate arms 23 on the comb or E block 22, are load springs 24. Attached at the end of each load spring is a slider 26 which carries a magnetic transducer (not shown in FIG. 1). On the other end of the actuator arm assembly 20 opposite the load springs 24 and the sliders 26 is a voice coil 28.

Attached within the housing 12 is a pair of magnets 30. The pair of magnets 30 and the voice coil 28 are key parts of a voice coil motor which applies a force to the actuator assembly 20 to rotate it about the actuator shaft 18. Also mounted within the housing 12 is a spindle shaft 32. Rotatably attached to the spindle shaft 32 are a number of disks 34. In FIG. 1, eight disks are attached to the spindle shaft 32. As shown in FIG. 1, the disks 34 are attached to the spindle shaft 32 in spaced apart relation.

Also shown in FIG. 1, is flexible cable 30 which carries electrical signals to and from actuator arm assembly 20.

Figure 2:
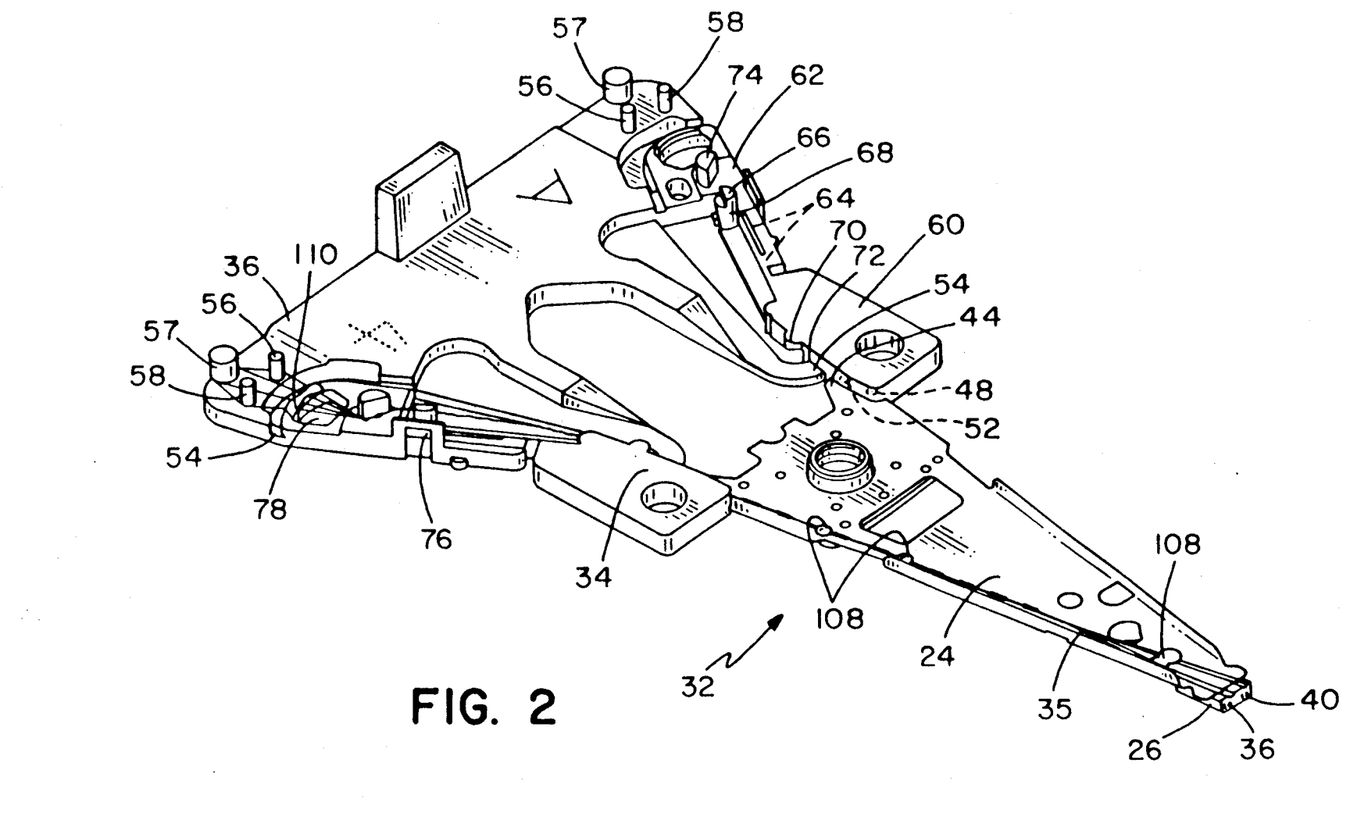
FIG. 2 is a perspective view of the loadspring manufacturing assembly.

FIG. 2 shows a view of the load spring 24 as it appears after the wire stringing process. The load spring 24 is a part of the load spring manufacturing assembly 32 which also includes a wire carrying and positioning tail 34 and a disposable portion 36. FIG. 2 shows the slider 26 attached to the load spring 24 and shows that the slider 26 includes a write element 38 and a read element 40. Also shown is that each of the heads requires two lead wires 35. This is best seen near the end of the load spring 24 having the slider 26 attached thereto.

Figure 4:
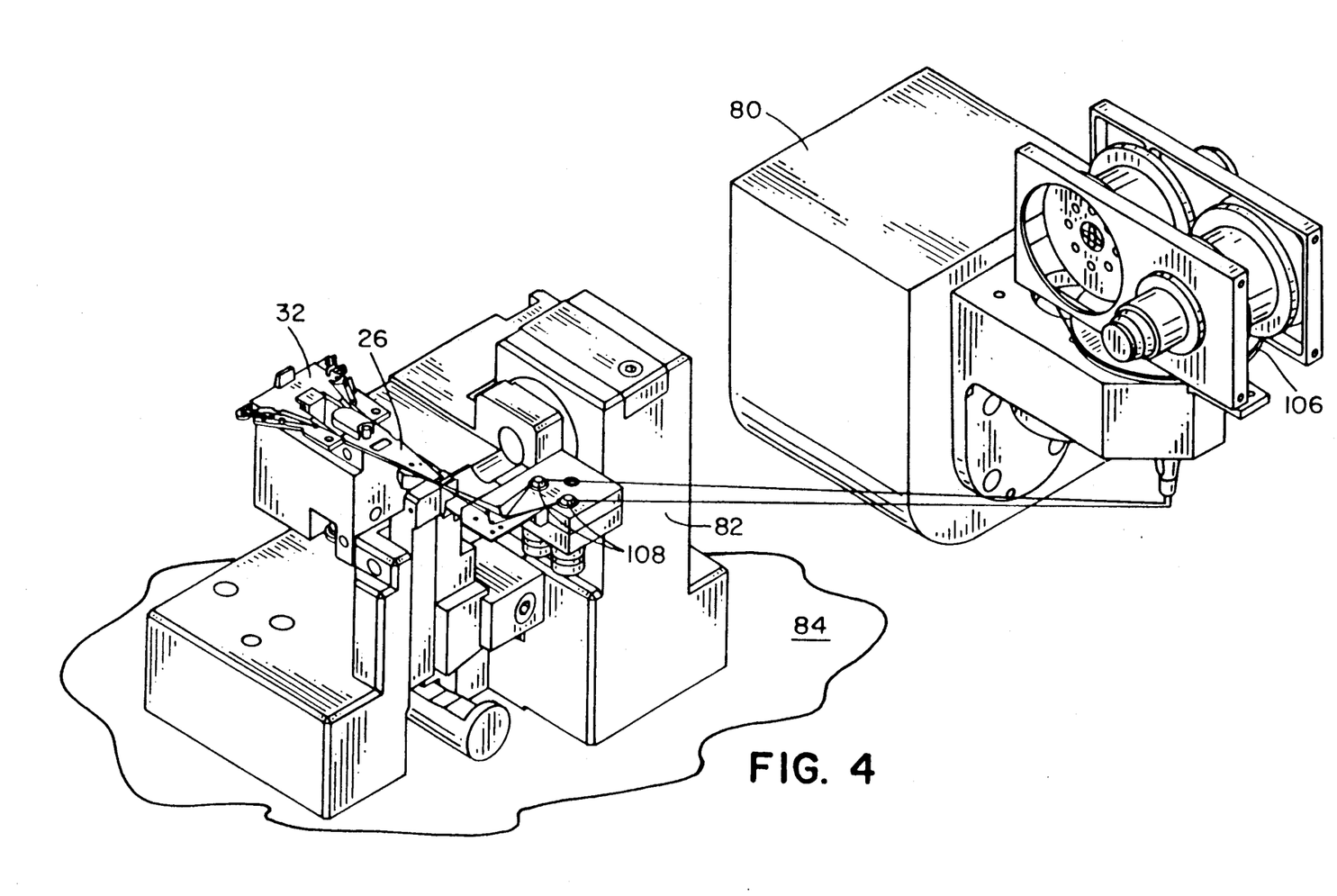
FIG. 4 is a top view of the manufacturing environment.

This particular invention deals with the method and apparatus for manufacturing the actuator arm assembly 20 and more specifically, stringing the wires on the load spring from the write element 32 and the read element 34 on the slider 26. Basically, the wire stringing process is carried out by a robot 80 as shown in FIG. 4. A fixture 82 holds the loadspring manufacturing assembly 32 in specified place on a table 84. As is well known in the art, the table 84 and the fixture or jig 82 position the loadspring manufacturing assembly 32 so that the robot 80 can repeatedly carry out the same motions to string wires 36 on different loadspring manufacturing assemblies 32. A robot such as the RT 3200 model robot manufactured by Seiko, is used to string the wires. The portion of the robot 80 unique to this invention is the end effector 86 which will be detailed later on in this description of the preferred embodiment.

Figure 3:
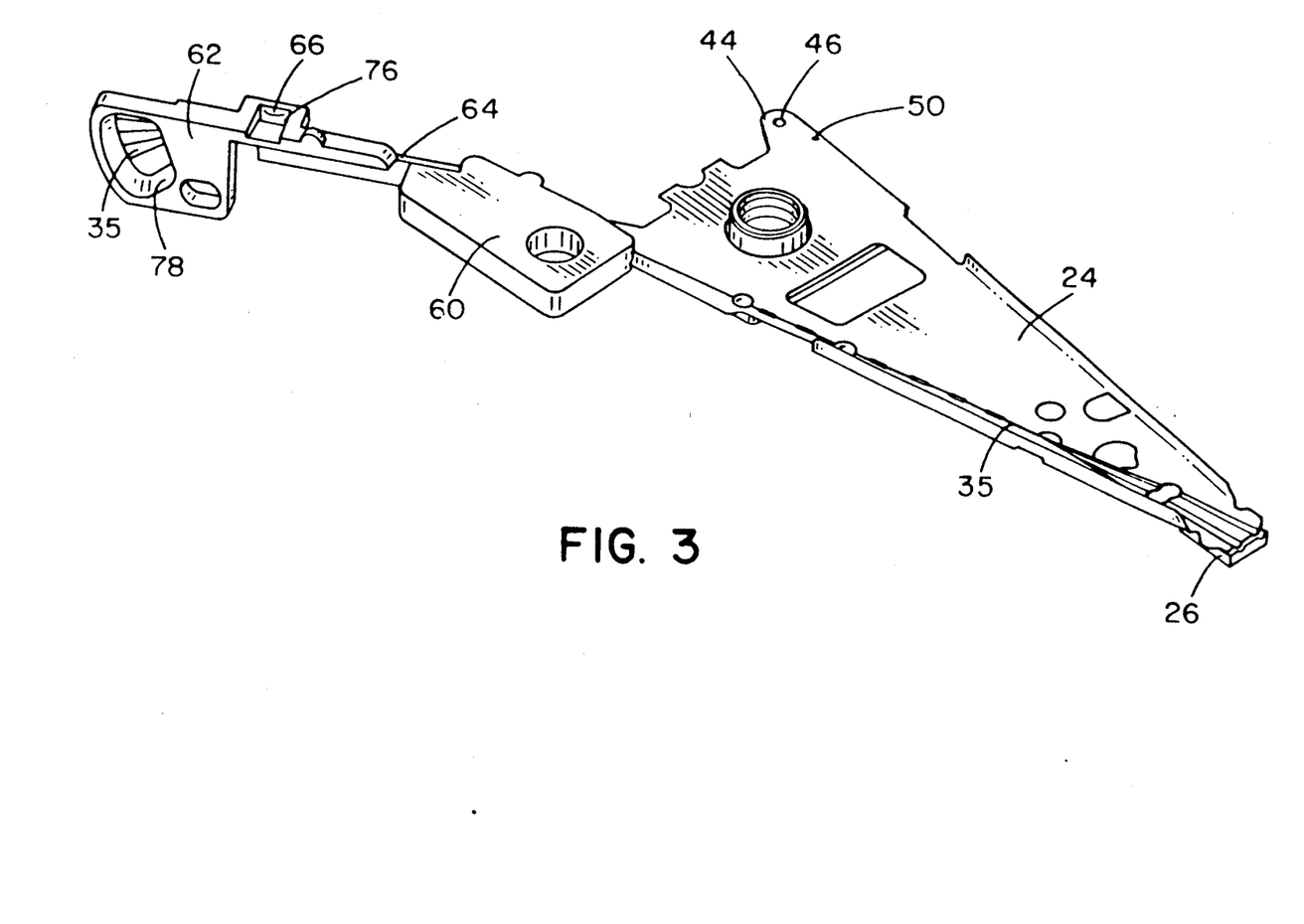
FIG. 3 is a perspective view of the loadspring after the several portions of the manufacturing assembly have been removed.

Now turning to FIGS. 2 and 3, the loadspring manufacturing assembly 32 will be described in detail. As mentioned previously, the loadspring manufacturing assembly 32 includes the load spring 24, the wire carrying and positioning tail 34 and the disposable portion 36. In actuality, the loadspring manufacturing assembly 32 includes a pair of wire carrying and positioning portions 34 so that the wires may be strung from the slider 26, along either side of the load spring 24 to either of the wire carrying and positioning portions 34. As is well known in the art, the actuator arm assembly 20 is comprised of a plurality of load springs 24 attached back to back on the various arms 23 on the comb 22 (See FIG. 1). Identical load springs 24 are used throughout the actuator arm assembly 20 and the flexible cable 30, to which all the wires 35 from the sliders 26 are attached, is located on one side of the actuator arm assembly 20. As a result, the sliders 26 attached to the arms which are disposed in one direction all have the wires 35 strung along the same side and all the load springs disposed in the opposite direction have the wires strung along the opposite side of the load spring 26. This enables the wires 35 from all the load springs 26 of the actuator assembly to terminate at the side of the actuator arm assembly 20 where the flexible cable 30 is located.

The pair of wire carrying and positioning tails 34 are attached to the load spring 24 at two places. The load spring 26 includes a pair of extensions 44. In FIG. 2 only one of these extensions 44 can be seen but it should be remembered that the load spring 24 is symmetrical about a longitudinal axis and that the second extension is located behind the closer of the two wire carrying and positioning tail 34. The extension 44 includes an opening 46. A shaft 48 of the plastic material, from which the wire carrying and positioning portion is made, passes through the opening 44. A second opening 50 is located in the loadspring 24 near each of the openings in the extensions 44. The second opening 50 is smaller in diameter than the first opening. A latching pin 52 of the plastic material passes through the second opening 50.

The disposable portion 36 of the loadspring manufacturing assembly 32 is not directly attached to the loadspring 24. The disposable portion 36 is attached to the two wire carrying and positioning tails 34 at four attachment points 54. The disposable portion 36 also includes an innermost peg 56, an intermediate peg 57, and an outermost peg 58 on each side of the disposable portion 36. The disposable portion serves several purposes. The innermost peg 56, the intermediate peg 57, and the outermost peg 58 are used as termination points and used to align the wires 35 so they can be more easily be attached to the flexible cable 30. The disposable portion also is used in positioning the loadspring manufacturing assembly 32 onto the fixture 82 in manufacturing. In addition, the disposable portion 36 also positions the two wire carrying and positioning tails 34 and stiffens the entire loadspring manufacturing assembly 32 during the wire stringing operation.

Still referring to FIG. 1, one of the tails 34 will be described in detail. It should be remembered that the tails 34 are symmetrical in shape and so description of one of the tails 34 serves to describe both of the tails. The tail 34 is made of two portions. The first portion 60 stays within a plane which is coplanar with the plane defined by the loadspring 24. The second portion is pivoted after the wires 35 are strung so that it is in a plane that is orthogonal to the first portion 60 (see FIG. 3). The first portion 60 and the second portion 62 have a living hinge 64 where the first portion 60 joins the second portion 62.

Located on the first portion 60, is a half pin 66 which is also used to hold wires 35 so that they can be twisted as well as to locate the wires. The half pin 66 includes a wire hook 68 for holding the wires 35 in a plane substantially coplanar with the first portion 60. The hook allows a robot to move upwardly when it twists the wires 35. The first portion also includes a second wire hook 70 which is used to hold down the wires and also hold them in place so they can be twisted during the wire stringing process which will be detailed later. The first portion 60 also includes a wire gate 72 to the tail 34 which is located at the forwardmost attachment point 54 between the disposable runner portion 36 and the tail 34.

The second portion 62 includes a wire alignment pin 74, a first window 76, and a second window 78. The first window 76 is located so that it passes over the half pin 66 on the first portion 60 when the second portion 62 is folded upward along the living hinge 64. The first window 76 latches onto the half pin 66 so that the second portion 62 remains in a plane orthogonal to the first portion 60. The second window 78 has the four wires 35 held in a fanned out arrangement from one end to the other. This facilitates the attachment of the wires to the flexible cable 30 during final assembly.

Figure 5:
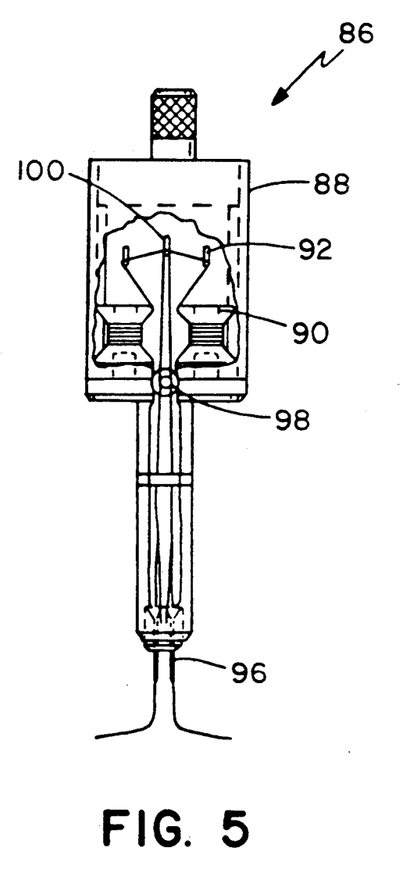
FIG. 5 is a front view of the manual end effector.
Figure 6:
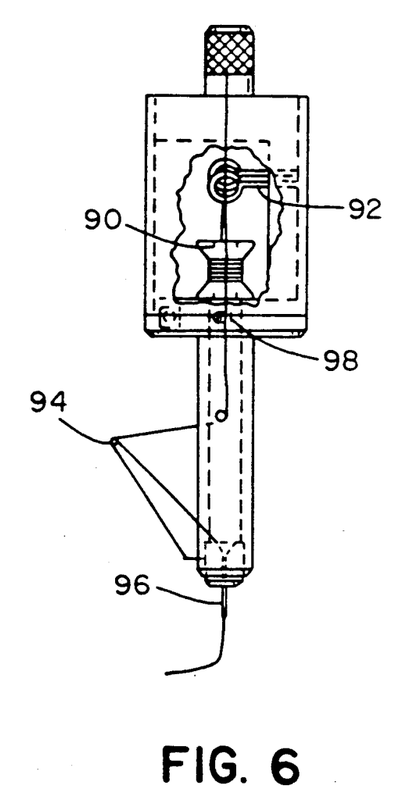
FIG. 6 is a side view of the manual end effector.

Now turning to FIGS. 5–8, the end effector shown in 4 is detailed. FIGS. 5 and 6 detail a manual version of the end effector 86 while FIGS. 7 and 8 detail the robotic version of the end effector. Looking at FIGS. 5 and 6, the manual end effector 86 has a housing 88. Mounted within the housing 88 are two wire spools 90 each having a corresponding wire guide 92, two tensioning devices 94, and a pair of spaced hollow needles 96 for the extraction of the wire 35. The end effector shown in FIGS. 5 and 6 also includes a magnet powered drag 98 which acts on the wires 35 to control the rate at which the wires are stripped off the wire spools 90. The magnet powered drag 98 actually prevents the wire 35 from stripping off the wire spools too quickly. The end effector 86 shown in FIGS. 5 and 6 also includes a tension spring 100 on each lead which acts to pull back any excess head leads in case the end effector is moved in the direction of less wire during the stringing of a loadspring manufacturing assembly 32. The end effector 86 shown is also capable of spinning about an axis so that a noise-shedding twist can be applied to each pair of wires 35.

Figure 7:
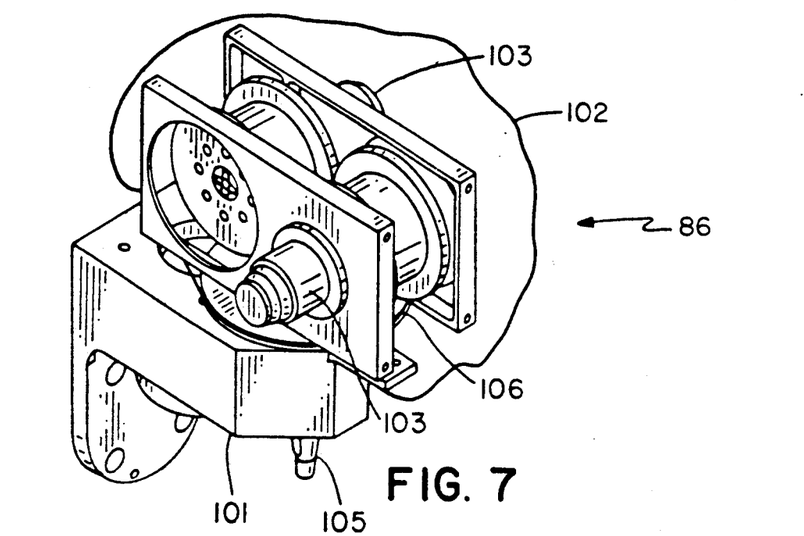
FIG. 7 is a perspective view of the end effector for a robot.
Figure 8:
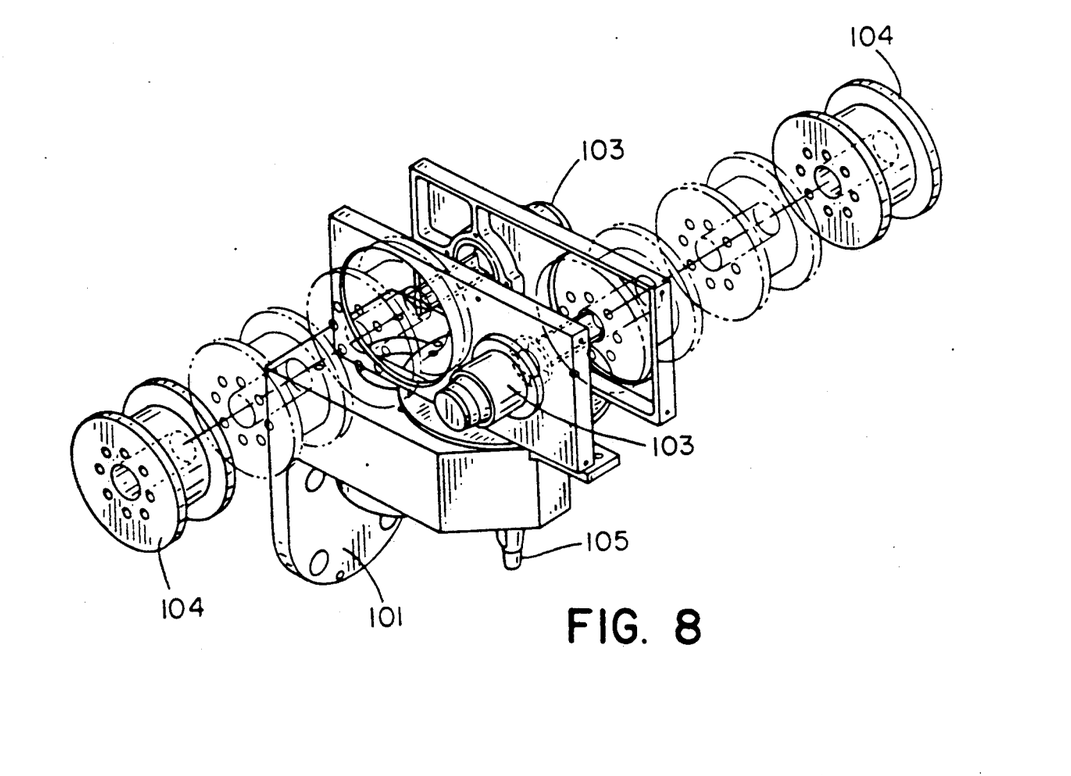
FIG. 8 is an exploded view of the end effector for a robot.

Now turning to FIGS. 7 and 8, the end effector 86 for the robotic version is shown and will be discussed in detail. Attached to a frame 101 is a removable cartridge 102. The removable cartridge 102 includes two DC torque motors 103. The DC torque motors 103 perform the same functions as the magnet powered drag 98 and the tension spring 100 did in the manual version, namely controlling the rate at which the wires 35 are stripped off the wire spools 104 and and pulling back excess head leads when the end effector 86 is moved in a direction of less wire during the stringing process. The wire cartridge assembly 102 also includes two hollow needles 105 which are used for wire feeding and positioning. The wire needles can be made of a variety of materials, however pyrex has been found to be superior form the standpoint of wire friction and wear.

A stepper motor (not shown) is attached to the frame 101 and rotates the wire cartridge assembly 102 using a timing belt or gear 106. The rotation allows the wires to be twisted for purposes of sound suppression. In addition, the rotation is also useful in routing the wires around the various features of the loadspring manufacturing assembly 32 during the wire stringing process.

The use of a cartridge attached to the frame is advantageous in that it can be quickly replaced when the wire on the wire spools 104 runs out or in the event of a wire breakage. The capability to change the cartridge quickly minimizes down time on the manufacturing line.

Figures 9A, 9B:
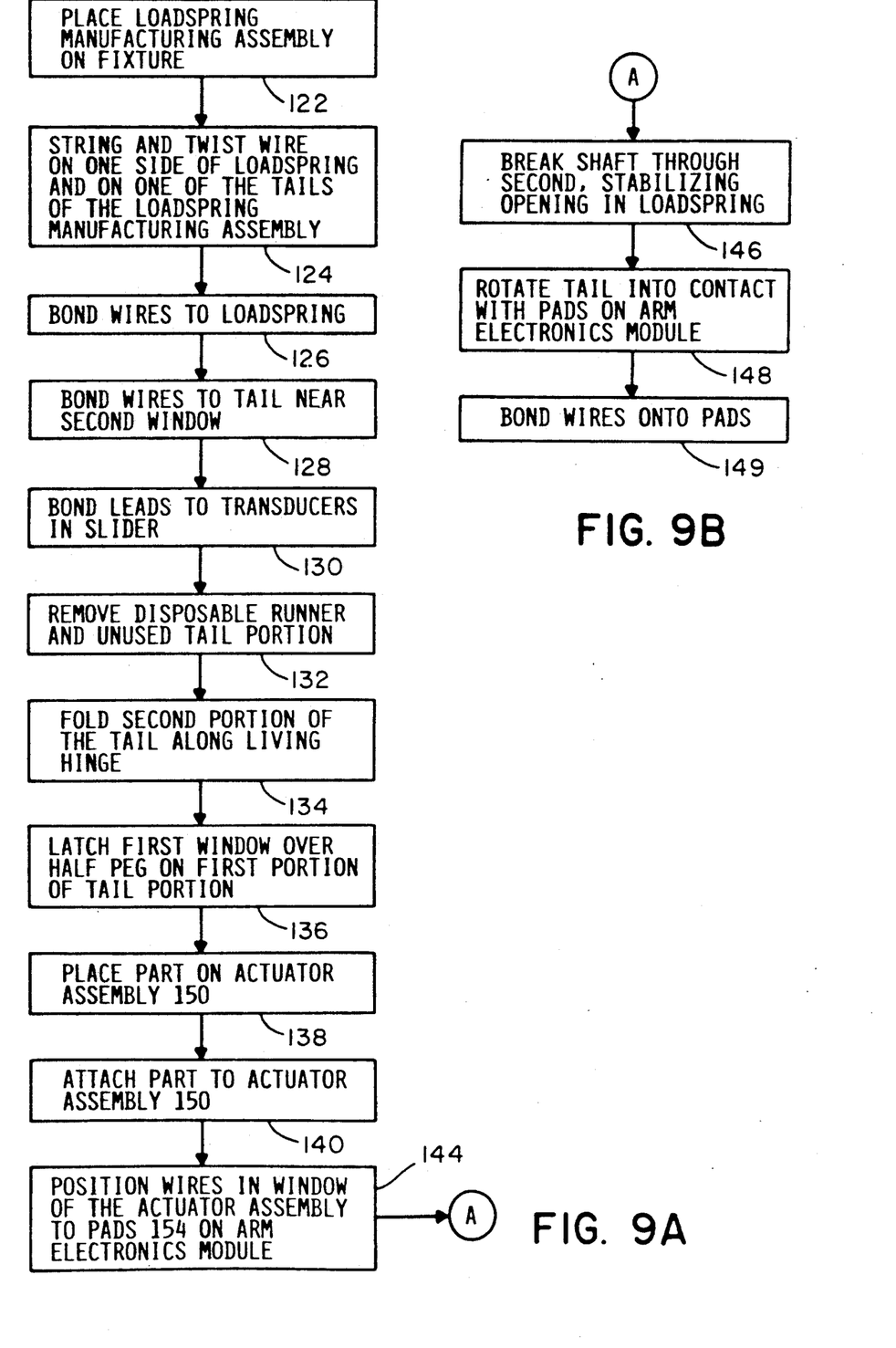
FIGS. 9A and 9B are a flow chart depicting the entire process.

Now turning to FIGS. 9A and 9B, the manufacturing process will be described in more detail. The initial step 122, is to place the loadspring manufacturing assembly 32 on the fixture 82. A pair of clamps 108 holds down the ends of the wires 35 on the fixture when the operation starts and ends. The next step 124 is to string and twist the wire on one selected side of the loadspring 24 and on the tail 34 along the same side of the loadspring manufacturing assembly 32. The twists in the wire are necessary for electrical noise suppression. After the wire is strung along the loadspring manufacturing assembly 32, the wires are bonded to the loadspring 24 as depicted by step 126. The wires 35 are bonded to the loadspring 24 at two sites 108 on the loadspring. The next step 128 is to bond the wires 35 near the second window 78 on the second portion 62 of the tail 34. A strip of adhesive is placed along bond site 110 which is between the side of the window 78 and the end of the tail 34. This adhesive keeps the wires in the fanned out shape after the disposable runner portion 36 of the loadspring manufacturing assembly 32 is removed. The next step is to bond the wires 35 near the slider 26 to the write head 38 and the read head 40 as depicted by the step 130.

The disposable runner portion 36 and the unused tail 34 is then removed as depicted by step 132. Step 134 is to fold the second portion 62 of the remaining tail along the living hinge 64. The next step 136 is to latch the first window 76 over the half pin 66 on the first portion 60 to hold the second portion 62 of the tail 34 in an upright position. The lead wires 35 held by the clamps 108 are attached to the pad on the slider 26 in another operation. Once this is accomplished the loadspring 24 with the tail 34 attached is placed with other similar parts onto an actuator comb 22 to form an actuator arm assembly 150 as is shown by step 140. Conventional means are used to attach the part to the comb 22.

Figure 10:
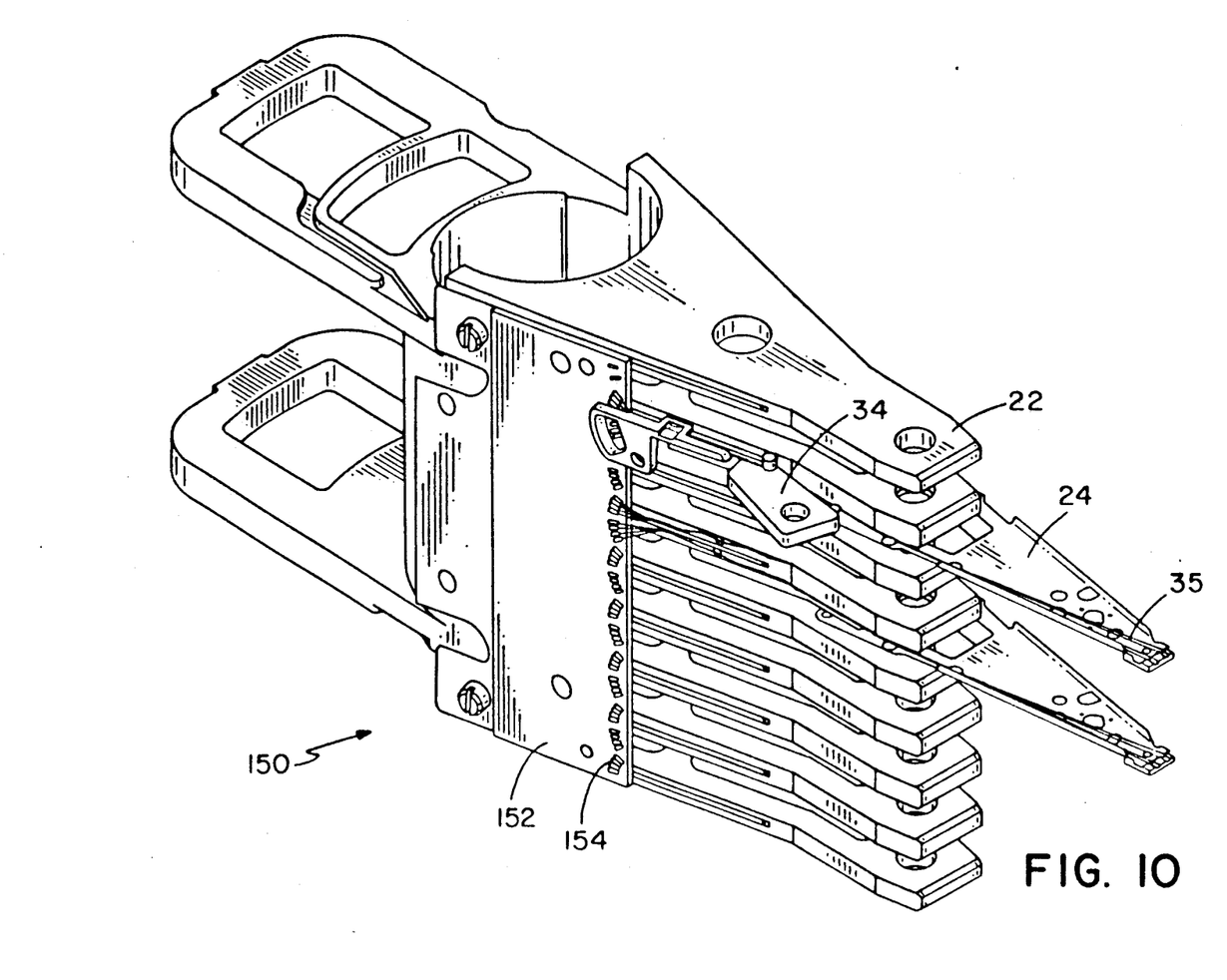
FIG. 10 is a view of the stringed actuator arm after it is attached.

The actuator assembly 150 shown in FIG. 10 includes an arm electronics module 152. The arm electronics module 152 includes a plurality of pads 154.

The wires 35 from the various read elements 40 and the various write elements 38 on the actuator arms 23 are then attached to the pads 154 as is depicted by step 144. The next step 146 is to break the stabilizing shaft 52 which passes through the opening 50 to allow the shaft 48 to rotate within opening 46 in the loadspring 24. The tail 34 is then rotated about shaft 34 into contact with the pads 154 on the arm electronics module 152 as depicted by step 148. Advantageously, the wires 35 in the second window 78 which are fanned out as they cross the window 78, are now positioned over the proper pad on the arm electronics module 152. Thus, the wires do not have to be sorted and then placed on the proper pads 154. The wires 35 are then bonded to the pads 154 as is shown by step 149. The wires 35 are also held by the window frame of the second window 78 during the bonding process.

The wire stringing process flow is now described. Clamp two wires to clamps 108 on fixture 82. Next route wires 35 through locating features on the fixture 82. Then move to wire carrying and positioning tail 34 and twist two wires together. Lay twisted wires 35 on loadspring 26 and route wires through wire carrying and positioning tail 34. Next move to the front and twist two wires together. Lay wires on loadspring 26 and route wires 35 through locating features on toolblock. Use clamps 108 and cut wires 35.

As can be seen, this invention is very advantageous. The wire stringing operation can now be fully automated which eliminates inconsistencies formerly associated with the hand operation. In addition, in forming the actuator arm assembly 20 the second window on the tail 34 is held in an upright fashion so that the wires 35 across the window 78 can be moved into contact with the pads 154 on the arm electronics module 152. The wires 35 are also positioned for bonding. This eliminates mistakes in sorting out the wires so they are attached to the proper pad 154. This invention saves time and eliminates tedious labor on fine materials where mistakes are prone to be made. In addition it is contemplated that the wires 35 may be bonded to the pads 154 either all at once for all 62 lead wires 35 or in groups of lead wires 35.

The present invention and the best mode of practicing it have been described. It is to be understood that the foregoing description is illustrative only and that other means and techniques can be employed without departing form the full scope of the invention as described in the appended claims:

What we claim is:

1. A method for assembling an actuator arm assembly having an arm electronics module using a loadspring manufacturing assembly which includes a loadspring, a tail portion attached to the loadspring, a disposable runner portion attached to the tail portion, and pegs on said tail portion and said disposable runner portion for positioning at least one pair of wires on the loadspring and on said tail portion, said method comprising the steps of:

positioning and twisting the pair of wires on the pegs of the load spring assembly, said positioned wires being spaced apart on a portion of the tail;

bonding the wires to the loadspring and the tail portion;

removing the disposable runner portion of the loadspring manufacturing assembly; and     placing the tail portion in a position so that the spaced wires on the tail will be positioned for attachment to a set of electrical pads on the arm electronics module having a distance between the centers corresponding to the space between the spaced wires.

2. The method for assembling an actuator arm assembly of claim 1, wherein said step of positioning and twisting the pair of wires is performed automatically by a mechanical apparatus.

3. The method for assembling an actuator arm assembly of claim 1, wherein:

said step of positioning and twisting the pair of wires positions said wires spaced apart on a portion of the tail in a plane substantially parallel to said loadspring; and     said step of placing the tail portion in a position comprises the step of rotating said portion of the tail on which said positioned wires are spaced apart to a plane substantially perpendicular to said loadspring.

4. The method for assembling an actuator arm assembly of claim 3, wherein said tail portion comprises a first portion, a second portion, and a hinge between said first portion and said second portion, said first portion being attached to said loadspring, and wherein said step of rotating said portion of the tail on which said positioned wires are spaced apart comprises rotating said second portion on said hinge.

5. The method for assembling an actuator arm assembly of claim 3, wherein said step of positioning and twisting the pair of wires is performed automatically by a mechanical apparatus.

* * * * *